(12) United States Patent
Gieshoff et al.

(10) Patent No.: US 8,136,349 B2
(45) Date of Patent: Mar. 20, 2012

(54) EXHAUST-GAS PURIFICATION SYSTEM WITH PARTICULATE FILTER AND METHOD OF OPERATION THEREOF WITH IMPROVED REGENERATION OF THE PARTICULATE FILTER

(75) Inventors: Jürgen Gieshoff, Biebergemünd (DE); Martin Votsmeier, Maintal (DE); Frank-Walter Schütze, Rodenbach (DE); Marcus Pfeifer, Solingen (DE); Egbert Lox, Hochwaldhausen (DE); Thomas Kreuzer, Karben (DE)

(73) Assignee: Umicore Galvanotechnik GmbH, Schwabisch Gmund (DE)

( * ) Notice: Subject to any disclaimer, the term of this patent is extended or adjusted under 35 U.S.C. 154(b) by 541 days.

(21) Appl. No.: 10/556,643

(22) PCT Filed: May 12, 2004

(86) PCT No.: PCT/EP2004/005103
§ 371 (c)(1),
(2), (4) Date: Dec. 11, 2006

(87) PCT Pub. No.: WO2004/101963
PCT Pub. Date: Nov. 25, 2004

(65) Prior Publication Data
US 2007/0119152 A1   May 31, 2007

(30) Foreign Application Priority Data
May 16, 2003   (DE) .................................. 103 22 148

(51) Int. Cl.
*F01N 3/00*   (2006.01)
(52) U.S. Cl. ................ 60/297; 60/274; 60/284; 60/295; 60/302; 60/311

(58) Field of Classification Search ................... 60/286, 60/295, 297, 303, 284, 302, 299, 311
See application file for complete search history.

(56) References Cited

U.S. PATENT DOCUMENTS
4,934,142 A   6/1990   Sumio et al.
(Continued)

FOREIGN PATENT DOCUMENTS
DE   10036401 B4   7/2009
(Continued)

OTHER PUBLICATIONS
International Search Report.
(Continued)

*Primary Examiner* — Binh Q Tran
(74) *Attorney, Agent, or Firm* — Kalow & Springut, LLP; Scott D. Locke, Esq.

(57) ABSTRACT

The present invention describes an exhaust-gas purification system for an internal combustion engine made of an oxidation catalyst arranged close to the engine, a subsequent hydrocarbon adsorber and a particulate filter arranged downstream thereof and provided with another oxidation catalyst. The oxidation catalyst ensures that emission limits with respect to carbon monoxide and hydrocarbons are satisfied in normal driving mode. During operating states with exhaust-gas temperatures below about 200° C., the oxidation catalyst can no longer oxidize carbon monoxide and hydrocarbons. Instead, the hydrocarbons are adsorbed by the hydrocarbon adsorber during these operating phases. In order to initiate the periodical regeneration of the particulate filter, the exhaustgas temperature of the internal combustion engine is raised by engine modifications. The increased exhaust-gas temperature leads to desorption of the previously stored hydrocarbons, which are then burned at the oxidation catalyst of the particulate filter, thereby supporting the regeneration of the particulate filter.

8 Claims, 1 Drawing Sheet

U.S. PATENT DOCUMENTS

| | | | |
|---|---|---|---|
| 6,044,644 A * | 4/2000 | Hu et al. | 60/302 |
| 6,080,375 A * | 6/2000 | Mussmann et al. | 423/213.5 |
| 6,089,015 A * | 7/2000 | Strehlau et al. | 60/274 |
| 6,167,696 B1 * | 1/2001 | Maaseidvaag et al. | 60/274 |
| 6,220,022 B1 * | 4/2001 | Muller et al. | 60/299 |
| 6,254,842 B1 * | 7/2001 | Hu et al. | 423/213.5 |
| 6,334,306 B1 * | 1/2002 | Mori et al. | 60/297 |
| 6,367,246 B1 * | 4/2002 | Hirota et al. | 60/295 |
| 6,497,851 B1 * | 12/2002 | Hu et al. | 423/213.5 |
| 6,568,179 B2 * | 5/2003 | Deeba | 60/298 |
| 6,782,694 B2 * | 8/2004 | Nakagawa et al. | 60/285 |
| 6,912,847 B2 * | 7/2005 | Deeba | 60/297 |
| 6,915,629 B2 * | 7/2005 | Szymkowicz | 60/289 |
| 2001/0036432 A1 * | 11/2001 | Hu et al. | 423/213.5 |
| 2002/0011069 A1 | 1/2002 | Maus et al. | |
| 2002/0053202 A1 * | 5/2002 | Akama et al. | 60/297 |
| 2003/0115859 A1 * | 6/2003 | Deeba | 60/297 |

FOREIGN PATENT DOCUMENTS

| | | |
|---|---|---|
| EP | 0697505 A1 | 2/1996 |
| EP | 1004347 B1 | 7/2006 |
| FR | 2796985 B1 | 7/1999 |
| JP | 11336530 | 12/1999 |
| JP | 2001 24321 A | 9/2001 |
| JP | 2003 090210 A | 3/2003 |

OTHER PUBLICATIONS

Written Opinion.

Heck, Ronald M., Robert J. Farrauto. Catalytic Air Pollution Control: Commercial Technology. Engelhard Corporation Research and Development. 1995. pp. 118-122.

* cited by examiner

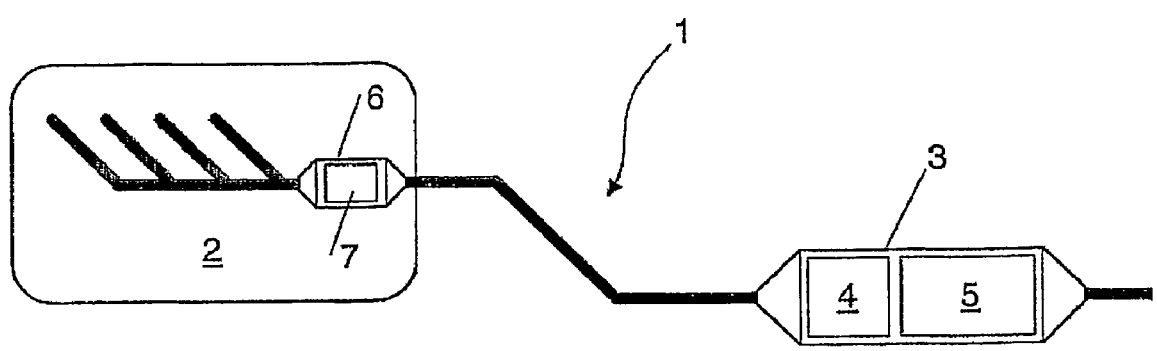

EXHAUST-GAS PURIFICATION SYSTEM WITH PARTICULATE FILTER AND METHOD OF OPERATION THEREOF WITH IMPROVED REGENERATION OF THE PARTICULATE FILTER

FIELD OF THE INVENTION

The present invention relates to an exhaust-gas purification system with a particulate filter for purifying the exhaust gases of an internal combustion engine and to a method of operating this exhaust-gas purification system with improved regeneration of the particulate filter. More particularly, this invention relates to an exhaust-gas purification system for a diesel engine containing a diesel particulate filter.

BACKGROUND OF THE INVENTION

Motor vehicles with diesel engines are gaining an ever greater share in the entire vehicle stock, inter alia, because of their comparatively low fuel consumption values. This also applies to diesel passenger cars, in particular.

A major problem of diesel engines, however, continues to be the purification of their exhaust gas. In addition to the pollutants known from gasoline engines, i.e., carbon monoxide (CO), hydrocarbons (HC) and various nitrogen oxides (NOx), the exhaust gas of diesel engines also contains soot particles. Moreover, diesel engines are operated with a lean air/fuel mixture so that their exhaust gas contains a high proportion of oxygen of about 5 to 15 vol.-%, while the exhaust gas of stoichiometrically operated gasoline engines has an oxygen content of only about 0.7 vol.-%. As a rule, the exhaust gas of diesel engines is also substantially colder than that of gasoline engines.

The exhaust gas of modern diesel engines for passenger cars has temperatures between only about 80 and 25° C. in urban traffic, i.e., when operated at partial load. Exhaust-gas temperatures reach 400 to 500° C. only at full load. These numbers refer to the temperatures at the engine outlet and, respectively, downstream of a turbocharger widely used today. Due to the thermal losses along the exhaust-gas purification system by heat dissipation and heat conduction the exhaust-gas temperature upstream of a catalyst arranged in the underfloor area lies substantially below these values.

These particular features of the diesel exhaust gas pose corresponding problems during its purification. Thus, the high oxygen content makes it impossible to simultaneously convert carbon monoxide, hydrocarbons and nitrogen oxides into the harmless compounds of water, carbon dioxide and nitrogen as in a stoichiometrically operated gasoline engine. However, as the emission of nitrogen oxides from a diesel engine is usually low it is frequently sufficient to purify the diesel exhaust gas using a so-called diesel oxidation catalyst, that is, carbon monoxide and hydrocarbons are converted into water and carbon dioxide at the diesel oxidation catalyst. Catalyst suitable for this purpose are described in DE 39 40 758 A1 (U.S. Pat. No. 5,157,007), U.S. Pat. No. 5,928,981 and EP 0 920 913 A1 (U.S. Pat. No. 6,342,465 B1), for example. These catalysts usually comprise a platinum-activated aluminum oxide mixed with other oxidic components, such as silicon dioxide, titanium oxide and various zeolites, for example.

In order to obtain a purifying effect with such an oxidation catalyst which starts as rapidly as possible the oxidation catalyst is usually arranged closely downstream of the engine outlet.

So-called diesel particulate filters are employed to remove the particles from the exhaust gas of diesel engines. These can be deep-bed filters, such as metal foams, ceramic foams or fiber filters, or surface filters. The so-called wall flow filters are suitable for use as surface filters. These are filters of the ceramic honeycomb body type, as are used in large numbers as carriers for catalytically active coatings in exhaust-gas catalysis. The entry and discharge openings of the flow passages of these honeycomb bodies are alternately closed to achieve a filtering effect so that the exhaust gas is forced to flow through the porous walls of the flow passages on its way through the wall flow filter. In doing so, the soot contained in the exhaust gas deposits mainly on the walls of the flow passages.

Increasing soot deposition continuously raises the exhaust backpressure of the filter. Therefore, the filter must be regenerated from time to time by burning the soot off. This, however, requires temperatures of the particulate filter of at least 600° C. in order to ignite the soot combustion. By coating the filter with a so-called soot ignition coating the ignition temperature of the soot can be lowered by about 100 to 150° C. But even in this case other active modifications are still necessary to raise the exhaust-gas temperature at the site of the particulate filter to the ignition temperature.

There exist various concepts for raising the temperature of the particulate filter. In any case, however, the regeneration of the filter entails an increase in energy or fuel consumption. The temperature of the filter may be raised by internal engine modifications, such as re-injection of fuel, late combustion point, multistage combustion or by external heating.

Internal engine modifications lead to an increase of the engine's exhaust-gas temperature. At the same time, the content of unburned hydrocarbons in the exhaust gas rises. These hydrocarbons are burned on the oxidation catalyst usually provided upstream of the particulate filter. The heat of combustion released in this process increases the exhaust-gas temperature further. It is also known to directly inject fuel into the exhaust gas upstream of the oxidation catalyst and burn it at the catalyst.

SUMMARY OF THE INVENTION

In addition to these active modifications, passive modifications are known for improving the filter regeneration. For this purpose, the filter may be provided with an already mentioned coating for reducing the soot ignition temperature.

It is an object of the present invention to provide an exhaust-gas purification system and a method of its operation which supports the active regeneration of the particulate filter and can reduce fuel consumption for the regeneration.

This object is solved by an exhaust-gas purification system for the exhaust gases of an internal combustion engine, which includes an oxidation catalyst and a catalytically coated particulate filter provided downstream thereof. The exhaust-gas purification system is characterized in that the oxidation catalyst is arranged close to the engine upstream of the particulate filter and a hydrocarbon adsorber is located between the oxidation catalyst and the particulate filter, wherein the particulate filter is coated with another oxidation catalyst for the combustion of hydrocarbons.

DETAILED DESCRIPTION OF THE PREFERRED EMBODIMENTS

Modern diesel engines emit an average of 0.2 to 0.5 grams of hydrocarbons per kilometer. The exhaust-gas purification system according to this invention utilizes at least part of these emissions in order to reduce the fuel consumption during the regeneration of the particulate filter. The hydrocarbon emission is particularly high during cold start. During this phase, the oxidation catalyst has not yet reached its light-off temperature so that the hydrocarbons pass the oxidation catalyst as they are and are adsorbed by the hydrocarbon adsorber. This also occurs during operating phases at low load and, accordingly, low exhaust-gas temperatures. During these operating phases, the oxidation catalyst is too cold in order to completely convert the emitted hydrocarbons. They are adsorbed by the hydrocarbon adsorber instead.

Only during operating phases at higher load will the exhaust-gas temperature exceed the light-off temperature of the oxidation catalyst so that the hydrocarbons will then be burned nearly quantitatively at the catalyst. However, a corresponding design of the exhaust-gas purification system can prevent the temperature at the hydrocarbon adsorber from exceeding the desorption temperature so that premature desorption of hydrocarbons is prevented. The desorption temperature is dependent on the adsorption material used and ranges between 150 to 240° C. for common materials, such as zeolites or activated carbon, for example. To prevent premature desorption, the hydrocarbon adsorber is therefore arranged closely upstream of the particulate filter in the underfloor area of the motor vehicle. Natural cooling and heat dissipation along the tail pipe produce substantially lower exhaust-gas temperatures here than at the engine outlet.

Following a certain period of operation the particulate filter must be regenerated. This is done by common engine modifications to increase the exhaust-gas temperature at the engine outlet. This also increases the emission of unburned hydrocarbons which are burned at the oxidation catalyst while releasing additional thermal energy. As a result, the exhaust-gas temperature at the hydrocarbon adsorber, too, increases to such an extent that desorption of hydrocarbons begins. The desorbed hydrocarbons are subsequently burned at the oxidation coating of the particulate filter, thereby increasing the exhaust-gas temperature at the particulate filter up to the soot ignition temperature.

Initiation of the regeneration should be triggered in particular when, on the one hand, the soot load allows reliable combustion to occur and, on the other hand, the storage loading is sufficiently high to reduce the additional fuel requirement.

The state of loading of the hydrocarbon adsorber depends on the driving profile of the vehicle user. A vehicle which is frequently run at high load fails to store any, or stores only an insufficient amount of, hydrocarbons in the hydrocarbon adsorber. The expected positive effect of desorbing hydrocarbons when regeneration is initiated will naturally be low in this case. This will, however, be unnecessary for such a driving profile as the high exhaust-gas temperatures lead to an at least partly continuous combustion of the soot.

By contrast, a vehicle having a high part of low-load operation stores a large amount of hydrocarbons in the hydrocarbon adsorber. This reduces its emission of hydrocarbons. At the same time, the engine's fuel consumption during initiation of the regeneration is lowered as the storage material desorbs a considerable amount of hydrocarbons during the regeneration.

Thus, the hydrocarbons accumulated during engine operating phases at a low exhaust-gas temperature are advantageously used to support the regeneration of the particulate filter and improve the energy balance of the regeneration. Fuel consumption needed for the regeneration may be lowered. Moreover, the adsorption of the hydrocarbons also improves the emission level; with the improvement being the stronger the greater the storage capacity of the hydrocarbon adsorber.

The oxidation catalyst is installed close to the engine according to the invention. Installation close to the engine guarantees the observance of emission limits in normal driving mode. Any known diesel oxidation catalysts of the state of the art may be employed for the purposes of the present invention. Thus, catalysts made of a mixture of a platinum-activated aluminum oxide or aluminum silicate with one or more zeolites may be used, for example. Of particular advantage, however, are also catalyst formulations containing no zeolites or only a very small amount of zeolites, because due to the installation of the oxidation catalyst close to the engine, the exhaust-gas temperatures at the installation site during the predominant part of engine operation will be above the desorption temperature for hydrocarbons so that the zeolites will be largely useless as hydrocarbon adsorbers here.

For the hydrocarbon adsorber, any adsorption materials are suitable which can absorb the unburned hydrocarbons emitted by the diesel engine within the temperature range between room temperature and 150 to 200° C. and desorb them again at higher temperatures. Various zeolites are suitable, such as,for example, ZSM5, DAY (dealuminized Y-zeolite), mordenite, silicalite, β-zeolite or mixtures thereof.

Zeolites are preferably used for the exhaust-gas purification system according to this invention. The zeolites may be present in the form of a bed of pelletized or extruded molded bodies or applied in the form of a coating onto a honeycomb body. The latter is particularly advantageous.

Essentially, the hydrocarbon adsorber does not include any activation by catalytically active components to prevent the hydrocarbons stored on the adsorber from being continuously burned already on the adsorber so that they are no longer available when the regeneration of the particulate filter is initiated. It may, however, be advantageous to catalytically activate the adsorber with platinum at a low concentration up to 0.1 g/l of adsorber volume to minimize coking of the adsorber material.

The amount of adsorber material used is specified such that the storage capacity of the adsorber is capable of adsorbing a large part of the diesel engine's hydrocarbon emissions between two regeneration rounds of the particulate filter. The storage capacity may be in the range between 1 and 50, preferably between 2 and 10 and particularly about 5 grams of hydrocarbons.

Compared to the prior art exhaust-gas purification system made of a zeolite-containing oxidation catalyst upstream of a particulate filter, the present invention presents essential advantages. By separating the oxidation catalyst from the hydrocarbon adsorber both components may be arranged at locations in the exhaust-gas system that are suitable for both of them: the oxidation catalyst may be located close to the engine so that it is rapidly heated up to its light-off temperature, and the hydrocarbon adsorber may be arranged far away from the engine in an area of low exhaust-gas temperatures to eliminate premature desorption of the hydrocarbons.

Separating the oxidation catalyst from the hydrocarbon adsorber also prevents premature desorption by oxidation of the hydrocarbons at the catalytically active centers of the catalyst and concurrent heating of the oxidation catalyst and storage material. Further, if the oxidation function and the adsorber function are separated the amount of the storage material used for the hydrocarbons may be determined according to the quantity of heat needed for filter regeneration, which depends on the size of the filter used but also on the filter material employed.

The method of operating the exhaust-gas purification system according to this invention is carried out as follows:

During operating states of the engine with exhaust-gas temperatures at the engine outlet below about 200° C., the hydrocarbons emitted by the engine and not converted by the oxidation catalyst are adsorbed at the hydrocarbon adsorber (storage phase), and the emitted soot particles are deposited on the particulate filter. During engine operating states with exhaust-gas temperatures at the engine outlet exceeding 200° C., the emitted hydrocarbons are converted by the oxidation catalyst.

The above-mentioned temperature of 200° C. is an example and does not constitute a strict limit. Rather, transition from the storage phase to oxidation of hydrocarbons at the oxidation catalyst is smooth and depends on the specific properties of the oxidation catalyst and the hydrocarbon adsorber.

Regeneration of the particulate filter is initiated if required or at regular intervals. The criterion used for the decision may be the exhaust backpressure of the particulate filter. The exhaust backpressure of the particulate filter increases with rising soot load. Regeneration will be initiated when a predetermined value for the permissible backpressure is exceeded.

This is done by raising the exhaust-gas temperature at the site of the hydrocarbon storage by engine modifications above the desorption temperature of the hydrocarbons, and the desorbed hydrocarbons are catalytically burned at the oxidation coating of the particulate filter.

In order to increase the mass of stored hydrocarbons the concentration of hydrocarbons in the exhaust gas may be raised by post-injecting hydrocarbons into the cylinders of the internal combustion engine during the storage phases, i.e., at a low exhaust-gas temperature.

DESCRIPTION OF THE FIGURE

FIG. 1 shows the basic structure of an exhaust-gas purification system 1. Reference number 2 denotes the internal combustion engine. A converter shell 6 is arranged in the exhaust-gas system closely downstream of the engine outlet and includes the oxidation catalyst 7. A second converter shell 3 with the hydrocarbon adsorber 4 and the particulate filter 5 arranged downstream is located in the underbody area.

Arranging the oxidation catalyst 7 close to the engine ensures that the exhaust-gas temperature at partial load and full load exceeds the light-off temperature of the oxidation catalyst and can nearly completely convert unburned hydrocarbons emitted by the engine. Shortly after cold start and when idling, however, the exhaust-gas temperature is usually below the light-off temperature of the oxidation catalyst so that the catalyst cannot convert the unburned hydrocarbons. Therefore, they reach the hydrocarbon adsorber 4 together with the exhaust gas to be nearly completely adsorbed there.

In the preferred embodiment of the exhaust-gas system shown herein, the hydrocarbon adsorber is located in the same converter shell as the particulate filter. When the engine control unit of the internal combustion engine initiates a regeneration of the particulate filter by raising the exhaust-gas temperature, then the hydrocarbons present on the hydrocarbon adsorber desorb as soon as the exhaust-gas temperature exceeds a value of about 200° C. at the site of the adsorber and reach the particulate filter where they are burned by the oxidation coating while releasing combustion heat. Thus, the soot deposited on the particulate filter is ignited and burned.

Preferably, a wall flow filter is used as the particulate filter. In that case the oxidation catalyst is coated on the entry side thereof.

What is claimed is:

1. An exhaust-gas purification system for the exhaust gases of an internal combustion engine (2) of a motor-vehicle comprising a converter shell (6) that is arranged in the exhaust-gas system closely coupled to an engine outlet and includes a first oxidation catalyst (7) that is not part of an underfloor area of the motor vehicle, and a hydrocarbon adsorber (4) having up to 0.1 g/L platinum on the hydrocarbon adsorber, wherein the platinum minimizes coking of the hydrocarbon adsorber and the hydrocarbon adsorber is arranged closely upstream of a particulate filter (5) in the underfloor area of the motor vehicle and downstream of the converter shell (6) wherein (i) the particulate filter is a wall flow filter, which is coated with a second oxidation catalyst on an entry side thereof, and (ii) the hydrocarbon adsorber and the wall flow filter are both disposed in one converter housing, wherein the particulate filter is separated from the hydrocarbon adsorber, and the engine comprises a diesel engine.

2. The exhaust-gas purification system according to claim 1, wherein a zeolitic coating on a honeycomb body is used as the hydrocarbon adsorber, which includes a mixture of the zeolites ZSM5, DAY and comprises platinum at a concentration of 0.1 g/L of honeycomb body volume as a catalytically active component.

3. The exhaust-gas purification system according to claim 2, wherein the first oxidation catalyst includes a catalytically active coating of platinum-activated aluminum oxide or aluminum silicate on a honeycomb body.

4. The exhaust-gas purification system according to claim 1, wherein the hydrocarbon adsorber comprises a storage capacity for hydrocarbons in the range between 1 and 50 g.

5. A method of operating the exhaust-gas purification system of claim 1, wherein during operating phases of the engine with exhaust-gas temperatures at the engine outlet below 200° C., the hydrocarbons emitted by the engine and not converted by the first oxidation catalyst are adsorbed at the hydrocarbon adsorber and the emitted soot particles are deposited on the particulate filter, while during operating phases of the engine with exhaust-gas temperatures at the engine outlet of more than 200° C., the emitted hydrocarbons are converted by the first oxidation catalyst, and the particulate filter is regenerated from time to time, wherein for initiating the regeneration, the exhaust-gas temperature is raised by engine modifications at the site of the hydrocarbon adsorber above the desorption temperature of the hydrocarbons and the stored hydrocarbons are desorbed and catalytically burned at the second oxidation catalyst of the particulate filter to support the regeneration.

6. The method according to claim 5, wherein the concentration of hydrocarbons in the exhaust gas is raised by post-injecting hydrocarbons into the cylinders of the internal combustion engine during the storage phases in order to increase the mass of stored hydrocarbons.

7. The exhaust-gas purification system of claim 1, wherein the first oxidation catalyst contains no zeolites or only a small amount of zeolites.

8. The exhaust-gas purification of claim 1, wherein the hydrocarbon adsorber has an absence of components that prevent hydrocarbons stored on the hydrocarbon adsorber from being continuously burned.

* * * * *